United States Patent [19]

Winders et al.

[11] 4,352,232

[45] Oct. 5, 1982

[54] CLIP LOADING AND FEED DEVICE

[75] Inventors: Gordon R. Winders, Oak Ridge, Tenn.; Fredric M. MacKay, Raleigh; Thomas E. Whittlesey, Apex, both of N.C.

[73] Assignee: Tipper Tie, Inc., Apex, N.C.

[21] Appl. No.: 233,972

[22] Filed: Feb. 12, 1981

[51] Int. Cl.³ ............................................. B23P 11/00
[52] U.S. Cl. ............................. 29/243.56; 53/138 A
[58] Field of Search ............ 29/243.5, 243.56, 243.57; 53/138 A; 221/312 A, 312 B

[56] References Cited

U.S. PATENT DOCUMENTS

| 2,880,419 | 4/1959 | Tipper | 29/243.57 |
| 3,115,733 | 12/1963 | Tipper | 53/138 A |
| 3,499,259 | 3/1970 | Tipper et al. | 53/415 |
| 3,543,378 | 12/1970 | Kleuz | 29/243.57 |
| 3,693,314 | 9/1972 | Reid et al. | 53/138 A |
| 4,083,164 | 4/1978 | Hagedorn | 29/243.56 |

Primary Examiner—James L. Jones, Jr.
Attorney, Agent, or Firm—Allegretti, Newitt, Witcoff & McAndrews, Ltd.

[57] ABSTRACT

A clip attachment device for affixing a generally circular clip about a mass of material includes a split mandrel mounted on a support arm. The mandrel is elastically deformable and in its normally expanded condition frictionally engages and retains or stores a plurality of clips. The pivotal support arm for the mandrel is movable between a position over a clip attachment opening in the base of the device and a clip indexing station. The mandrel is translatable in a longitudinal direction so that a clip at the clip attachment station may be positioned by longitudinal movement for engagement by clip closure dies. The dies can partially close and compress about one clip. The mandrel may then be withdrawn with the remaining clip to the indexing station. The retained clip may then be further compressed by the dies about a mass of material. Upon arrival at the indexing station, the mandrel with the remaining clips is automatically plunged into a gauging die which compresses the split mandrel and allows the clips to drop down one clip thickness. This function reindexes the clip stack height so that one clip is in the proper vertical location for engagement with the closure dies.

9 Claims, 4 Drawing Figures

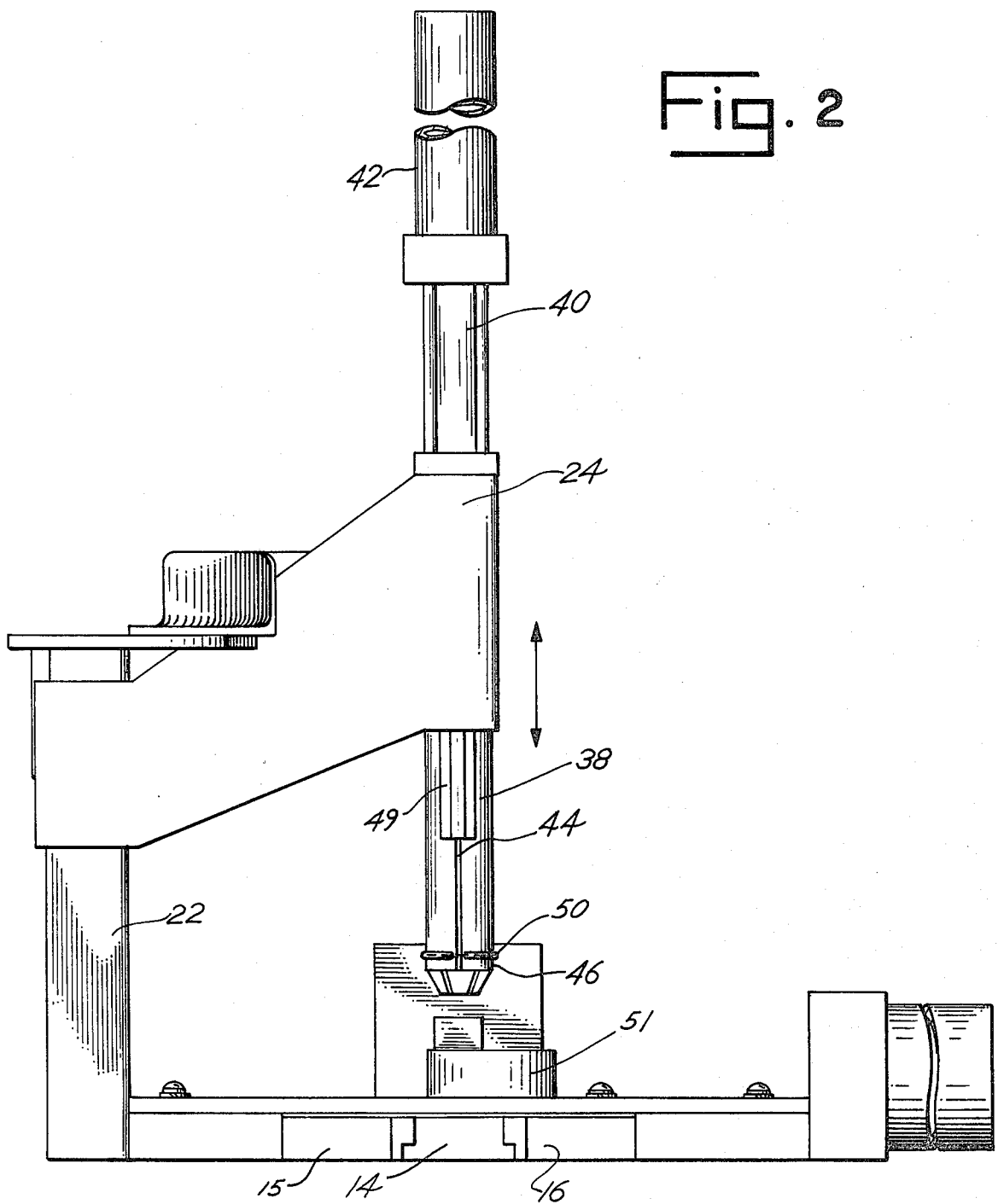

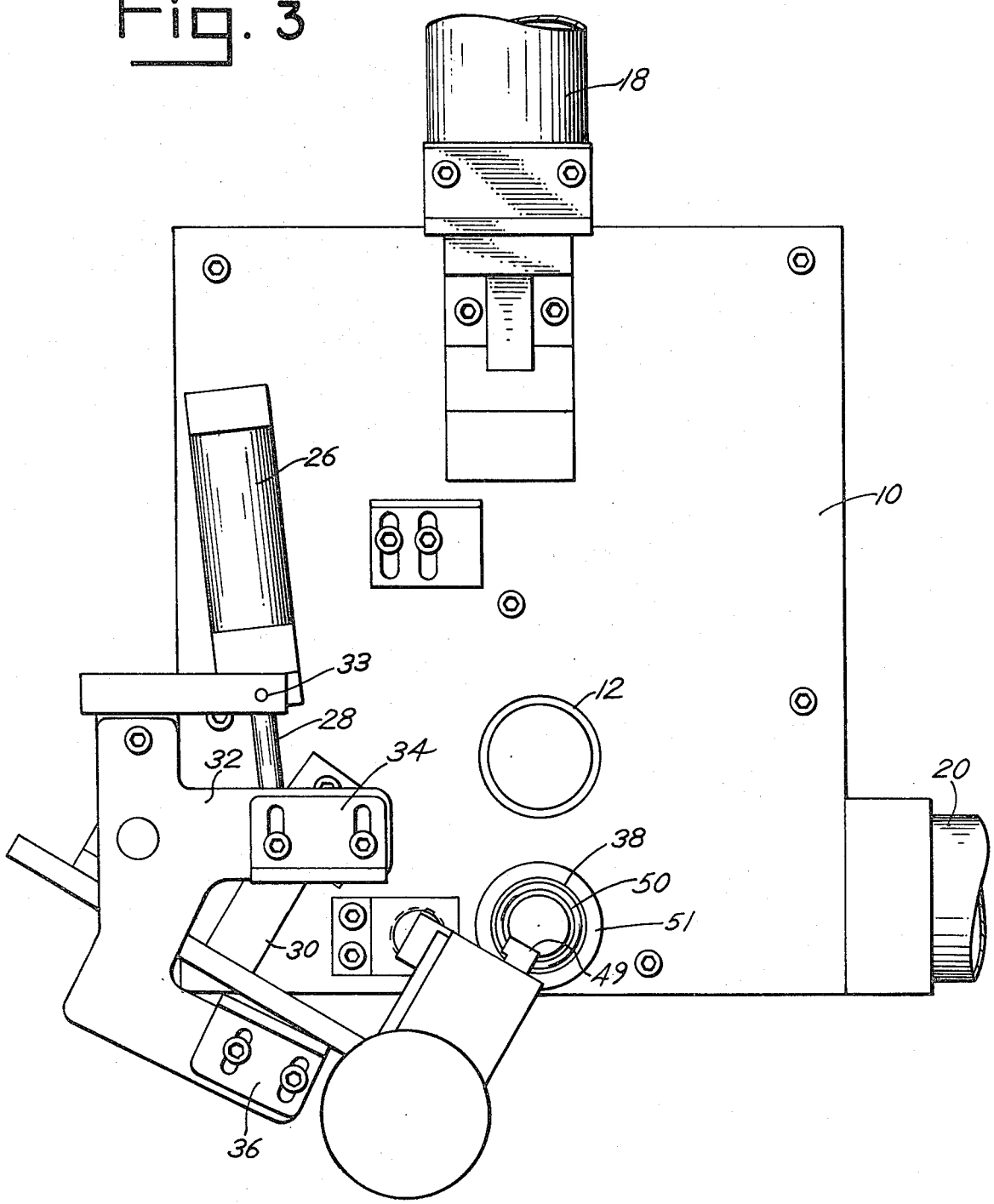

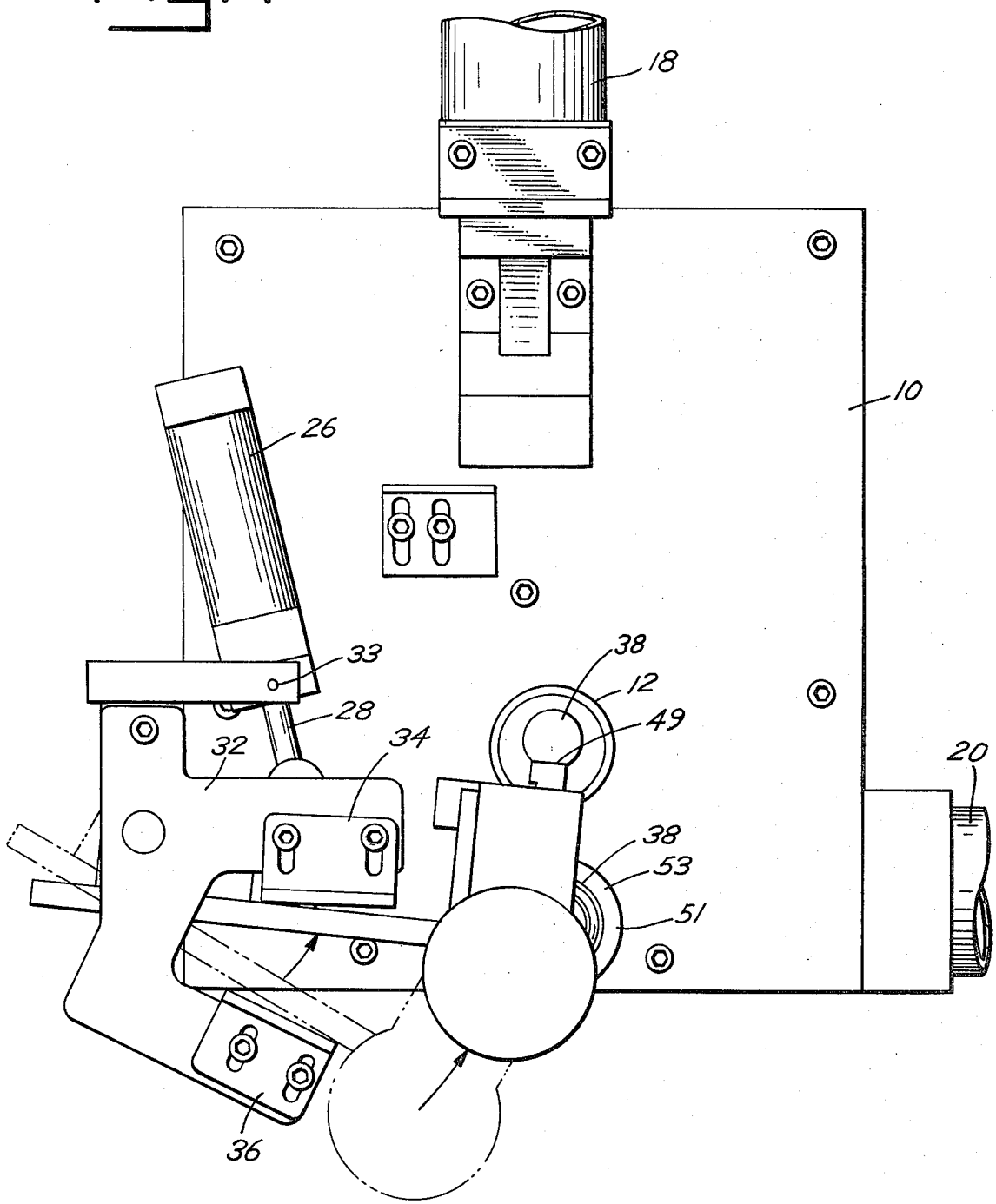

CLIP LOADING AND FEED DEVICE

BACKGROUND OF THE INVENTION

This invention relates to an improved clipper device which includes means for positioning a single, generally circular clip about a mass of material and affixing or compressing the clip about the mass.

Numerous types of apparatus have been designed for the attachment of a generally U-shaped or circular clip about a mass of material. With respect to U-shaped clips, for example, Tipper, in U.S. Pat. No. 2,880,419, discloses an apparatus for fastening casings with staple-like fasteners. In U.S. Pat. No. 2,880,419, a U-shaped clip is positioned within a channel and driven downwardly by a punch into contact with a die mechanism. The punch forms the clip about a mass of casing material positioned on top of the die. Clips are fed one at a time into the channel for engagement by the punch. U.S. Pat. No. 3,115,733 discloses a similar apparatus wherein the clips are depicted as being mounted on a rail for feeding into the clip drive channel one at a time. This is generally the method for positioning clips with respect to a mass of material; namely, feeding the clips through a window or opening into the clip channel so that a single clip may be engaged by a punch for translation and engagement about a mass of material.

Tipper, in U.S. Pat. No. 3,499,259, discloses a similar rail mounting arrangement for supporting clips as they are fed into a double clipper apparatus. In Canadian Patent No. 760,203 issued June 6, 1967, Tipper discloses an assembly of clips which may be utilized for feeding into a clipper device. Klenz, in Patent No. 3,543,378, discloses again a mounting rail for clips which are fed into a clipper device. FIG. 6 of Klenz Patent No. 3,543,378 is particularly illustrative of the clip feed mechanism.

The aforesaid devices are generally utilized for the feeding and attachment of U-shaped clips. In certain applications, however, circular clips or generally circular clips are required. For example, in Velarde U.S. Pat. No. 3,940,841, dated Mar. 2, 1976, entitled "Clipper Apparatus for Attaching Material to a Broomstick or the Like", a device for attaching circular clips about a solid mass is disclosed. Though circular clips can be fed into a clipper device in a manner similar to the feeding devices for U-shaped clips, such a feeding device is not desirable for all applications. For example, if the mass about which the circular clip is to be fastened is large or extends any distance beyond the clip attachment position, it may be necessary to utilize some special clip feeding device. Also, if the circular clip does not lie in a single, uniform plane, then it may be advisable to have a special clip feeding device which will accommodate the uniquely formed clip.

The present invention therefore contemplates a mechanism which feeds generally circular clips into a clip attachment device by appropriately indexing and positioning such clips between dies that are used to attach the clip about a mass of material.

SUMMARY OF THE INVENTION

Briefly, the present invention comprises a clip attachment device for attaching a generally circular clip about a mass of material. The clip attachment device includes a bracket or plate with an opening for receipt of the mass of material about which the clip is to be fastened. Movable dies are positioned about the sides of the opening for engaging and fastening a clip about the mass. A pivot arm, attached to the bracket, supports a mandrel. A plurality of circular clips are frictionally retained on the mandrel. The mandrel is slotted and, therefore, elastically deformable. A pivoting mechanism positions the pivot arm so that the mandrel and retained clips may be lowered into the bracket opening. A single clip is situated between the dies in this manner. The dies are then partially closed to engage the single clip. The mandrel may then be withdrawn so that the single clip is retained by the dies. The remainder of the circular clips are frictionally retained on the mandrel as it is withdrawn or raised. The support arm and mandrel are then pivoted from the clip attachment position, and the mass is inserted in the opening after which the circular clip is fastened about the mass by action of the dies.

At the clip indexing station, the mandrel with the remaining clips is plunged into engagement with a gauging die which compresses the mandrel so that a column of clips on the mandrel will drop into a proper location on the mandrel so that one clip again is in position for gripping by the dies. The mandrel is then raised and available for positioning a clip between the clip attachment dies.

Thus, it is an object of the present invention to provide an improved clip indexing mechanism.

Another object of the present invention is to provide an improved clip indexing and positioning mechanism particularly useful with circular clips and clips of various sizes and shapes.

Still another object of the present invention is to provide an improved clip mechanism having a simple yet unique construction which is economical to manufacture and easy to use.

Another object of the invention is to provide a clip attachment mechanism having a split mandrel for retaining the clips and further including a pivot arm to support the mandrel and position the mandrel at a desired indexing or clip attachment station.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 2 is a side elevation of the improved clip mechanism of the present invention;

FIG. 3 is a top plan view of the mechanism of FIG. 1; and

FIG. 4 is a top plan view similar to FIG. 3 wherein the clip retention mandrel is positioned over the clip attachment die.

DESCRIPTION OF THE PREFERRED EMBODIMENT

Figure 1:
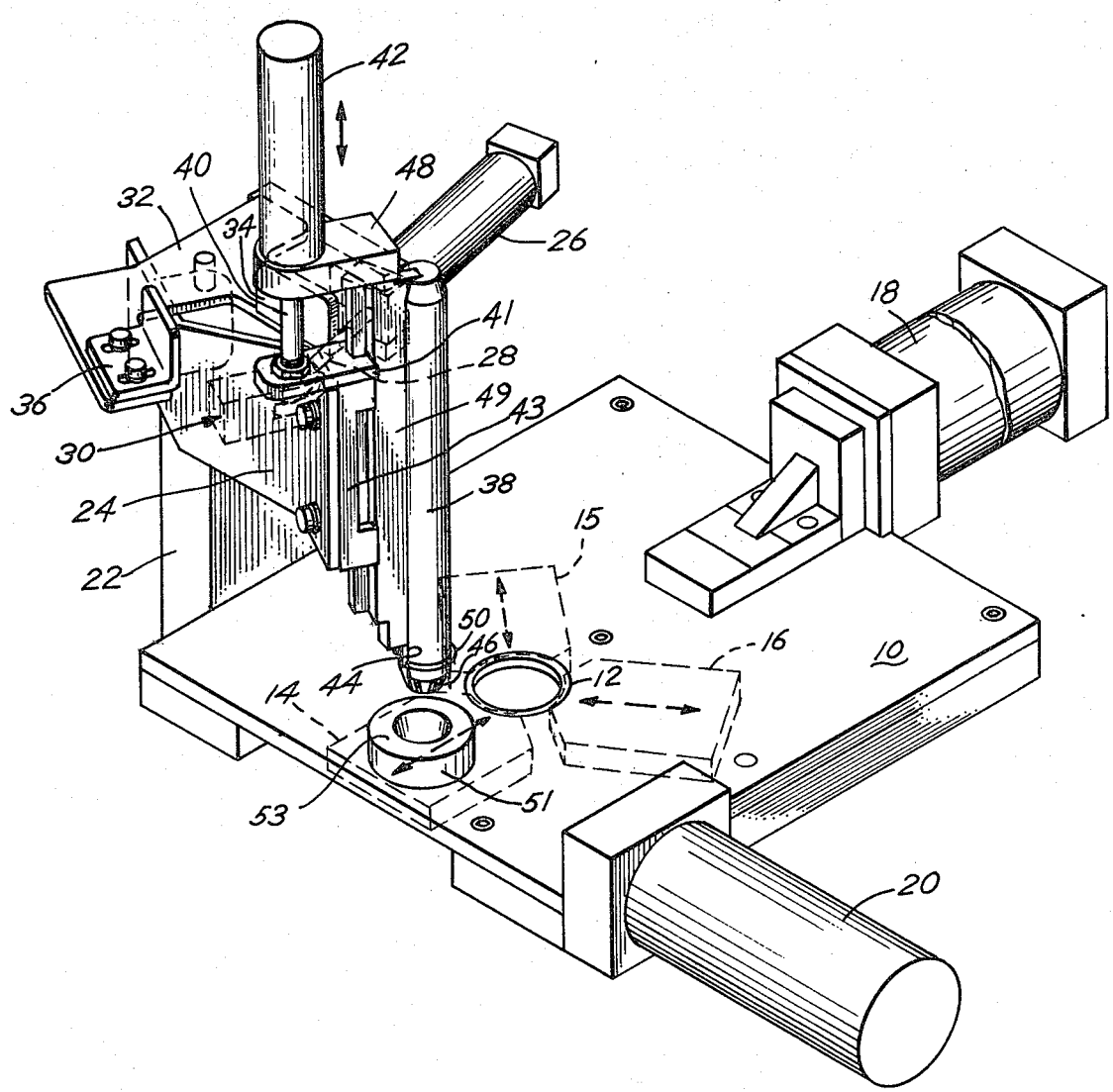
FIG. 1 is a perspective view of the improved clip attachment mechanism of the present invention.

Referring to the drawings, the clip attachment mechanism of the present invention is mounted on a support bracket or plate 10 which is mounted on a packaging machine or retained in position by appropriate bracket support members (not shown). Generally the plate 10 is maintained in a horizontal plane. The support plate 10 includes a circular opening 12 through which material to be clipped may be inserted. The opening 12 is surrounded by an arrangement of three clip die members 14, 15 and 16 that are, in turn, operated by two drive pistons 18 and 20 respectively. Thus, when a mass of material has been inserted through the opening 12, a control mechanism causes the cylinders 18 and 20 to operate and drive the die members 14, 15 and 16 about a clip positioned in the opening thereby attaching the clip to the mass of material in the opening 12. Velarde, in patent application Ser. No. 101,171, filed Dec. 7, 1979, now U.S. Pat. No. 4,304,116 discloses another type of die arrangement which could possibly be used in place of dies 14, 15 and 16.

This invention relates to the mechanism for positioning a clip 50 precisely in the opening 12 so that the clip 50 may be properly attached to material inserted through the opening 12. Thus, a support post or rod 22 projects vertically from the plate 10. A pivot arm 24 is attached to rod 22. The pivot arm 24 may thus be pivoted about a vertical axis defined by the rod 22 between a first position associated with the opening 12 and a second position associated with an indexing die 51 attached to the plate 10.

The pivot arm 24 is driven by a cylinder 26 between the described first and second positions. The cylinder 26 is suspended from a bracket assembly 32 attached to the top of rod 22 and includes a drive rod 28 attached to a mounting block 30 affixed to the pivot arm 24. The cylinder 26 is retained on the bracket assembly 32 by means of a pin 33 in FIG. 3 which permits pivotal movement in a horizontal plane in response to action of the cylinder 26 and rod 28 on arm 24. The bracket assembly 32 also includes bifurcated stops 34 and 36 which limit the travel of the pivot arm 24 in response to actuation of cylinder 26.

A vertical split mandrel 38 is supported from the outside end of pivot arm 24 by a top bracket support 48. The bracket support 48 is attached to a drive cylinder 42 and drive rod 40 of cylinder 42 is affixed to a plate 41 attached to arm 24 and a slide yoke 43. Mandrel 38 is mounted on slide 49 which cooperates with yoke 43. The top end of slide 49 is affixed to bracket 48.

The rod 40 may thus be operated by the cylinder 42 to effectively move cylinder 42, bracket 48, slide 49 and mandrel 38 in a vertical up or down direction with respect to the pivot arm. Thus, the split mandrel 38 will also move vertically in response to movement of the cylinder 42.

The mandrel 38 is comprised of a generally cylindrical member having a plurality of longitudinal slots 44 extending axially from one end toward the opposite end. Preferably slots 44 extend upwardly from the bottom of mandrel 38. An elastomeric or rubber stopper 46 is inserted inside the open, bottom end of the mandrel 38. The elastomeric stopper 46 tends to spread the sections or sides of the split mandrel 38 defined by the slots 44 thus increasing the effective diameter of the mandrel 38 adjacent the stopper 46.

The generally circular clips 50 may be positioned on the mandrel 38. The clips 50 are oriented on mandrel 38 by coaction of the slide 49 and clip ends which serve to center the clip 50 on the mandrel 38. In this manner a plurality of clips 50 may be arranged sequentially or in a stack or column on the mandrel 38.

An indexing die 51 is mounted on the plate 10 and includes an inner counterbore adapted to receive the end of mandrel 38. When the mandrel 38 is lowered by action of the cylinder 42, the end of mandrel 38 fits into die 51 and is compressed slightly. This causes the clips 50 to fall or descend onto the top surface or land 53 of die 51. The mandrel 38, upon withdrawal from die 51, expands to retain the repositioned clips 50. In this manner the clips 50 and more particularly the bottom clip 50 is in position on mandrel 38 for gripping by jaws or die members 14, 15, 16 when mandrel 38 is indexed in opening 12.

In operation, the mandrel 38 is pivotal between a first position directly over the opening 12 and a second position adjacent the opening 12 over die 51 as shown in FIGS. 4 and 3 respectively. In order to position a single clip 50 within the opening 12 for engagement by dies 14, 15, 16, the cylinder 26 is operated to pivot the arm 24 and attached mandrel 38 into position over opening 12. The vertical control cylinder 42 is then operated to lower the mandrel 38 into the opening 12. Cylinders 18 and 20 are then operated to partially close the die members 14, 15, 16 about a clip 50 positioned within the opening 12. Upon reverse operation of cylinder 42, the clip 50 is retained by the dies 14, 15, 16 and will slip from the mandrel 38. The remaining clips 50 are, however, retained on the mandrel 38.

The mandrel 38 may then be pivoted by the action of the cylinder 26 out of position over the opening 12. Upon arrival at the second station over die 51, the mandrel 38 with the remaining clips 50 is automatically plunged into the gauging die 51 which compresses the split mandrel 38 and allows the clips 50 to drop down one clip thickness. This reindexes the clip stack height so that one clip 50 is in the proper vertical location for engagement with the closure dies 14, 15, 16.

Meanwhile, material which is to be gathered and clipped may be inserted through the opening 12 preferably from the bottom of the plate 10. The cylinders 18 and 20 may then be fully cycled to attach the circular clip 50 about material projecting through the opening 12.

Reversal of the action of the cylinders 18 and 20 will permit removal of the material that has been gathered and clipped. Specific sequencing control mechanisms for the cylinders 26, 42, 18 and 20 is within the scope of those skilled in the art. A typical construction for the die members 14, 15, 16 is disclosed in application Ser. No. 156,762, filed June 5, 1980, now U.S. Pat. No. 4,339,940 in the name of MacKay, et al, entitled "Multipart Die for Attachment of a Metal Clip", which is incorporated herewith by reference.

The mechanism of the present invention thus positions a discreet, single, circular clip 50 for attachment to material. It is possible, of course, to vary the design of the specific embodiment of the invention without departing from the scope of the invention. The invention is therefore to be limited by the following claims and their equivalents.

What is claimed is:

1. In a clip attachment device for affixing generally circular clips about a mass, said device of the type including a base, an opening in the base for receipt of the mass, a set of clip engaging dies positioned about the opening to engage a clip and movable toward a point in the opening to form the clip about the mass, the improvement of means for positioning an individual clip for gripping by the dies prior to appication of the clip to the mass, said improvement comprising in combination:
(a) a support arm pivotally mounted on the base;
(b) a mandrel for receipt of a plurality of clips, said mandrel attached to the support arm, said arm and mandrel being pivotal between a first position for maintaining the mandrel over the opening and a second position;

(c) means for translating the mandrel toward the opening when said mandrel is in the first position to thereby position a single clip intermediate the dies; and (d) means for closing the dies on a clip when intermediate the dies, said mandrel being elastically deformable and permitting retention of the clip by the dies upon removal of the mandrel by translation away from the opening, the remaining clips being retained on the expanded mandrel.

2. The improvement of claim 1 wherein said mandrel is comprised of a generally cylindrical member having at least one longitudinal slit whereby the mandrel is compressible to reduce the circumference thereof.

3. The improvement of claim 1 wherein said pivot arm is movable through an arc in a plane generally parallel to the plane of the dies.

4. The improvement of claim 3 wherein the means for translating the mandrel comprises a drive mechanism to translate the mandrel in a direction generally transverse to the plane of the dies.

5. The improvement of claim 2 including an elastomeric member interposed in the slit to bias the mandrel to a noncompressed position.

6. The improvement of claim 1 including means at said second position for indexing clips on the mandrel.

7. The improvement of claim 6 wherein said means for indexing comprise means for compressing the mandrel to permit sliding and positioning of said clips on the mandrel.

8. The improvement of claim 6 wherein said means for indexing comprise a cooperating counterbore member mounted in the vertical movement path of the mandrel, said counterbore member including means for compressing the mandrel upon insertion into said member and means for limiting travel of clips on the mandrel.

9. In a clip attachment device of the type for affixing generally circular clips about a mass, said device of the type including a base, an opening in the base for receipt of the mass, a set of clip engaging dies to engage a clip and movable toward a point in the opening to form the clip about the mass, the improvement of means for positioning individual clips for gripping by the dies prior to application of the clip to the mass, said improvement comprising, in combination:

(a) a pivotal support arm attached to the base;

(b) a mandrel for holding a plurality of clips, said mandrel slidably attached to the support arm, said mandrel including an elastically compressible member for retaining a plurality of clips; said support arm pivotal between a position indexing the mandrel over the opening and a non-indexing position;

(c) clip die members on opposed sides of the opening, said die members movable to engage and partially compress the mandrel and a clip on the mandrel, and also movable to further compress a clip about a mass, said mandrel translatable with respect to the opening when in the indexed position between a first projected position for maintaining a clip intermediate the die members and a retracted position; and (d) die member driving means for closing the die members partially about a clip on the mandrel when the mandrel is in the indexed and projected position to elastically deform the mandrel and retain the clip and for further closing the die members about a mass placed in the opening upon withdrawal of the mandrel to a retracted position.

* * * * *